United States Patent
Schubert et al.

(10) Patent No.: US 12,397,594 B2
(45) Date of Patent: Aug. 26, 2025

(54) TIRE PRESSURE MONITORING SYSTEM COMMUNICATION METHOD AND SYSTEM

(71) Applicant: Ford Global Technologies, LLC, Dearborn, MI (US)

(72) Inventors: Jochen Schubert, Farmington Hills, MI (US); Dilip B. Patel, Novi, MI (US); Arick Evan Rushing, Ypsilanti, MI (US)

(*) Notice: Subject to any disclaimer, the term of this patent is extended or adjusted under 35 U.S.C. 154(b) by 287 days.

(21) Appl. No.: 18/327,696

(22) Filed: Jun. 1, 2023

(65) Prior Publication Data
US 2024/0399801 A1    Dec. 5, 2024

(51) Int. Cl.
B60C 23/04    (2006.01)
H04L 9/08    (2006.01)
H04L 9/32    (2006.01)

(52) U.S. Cl.
CPC ........ B60C 23/0416 (2013.01); B60C 23/044 (2013.01); H04L 9/0825 (2013.01); H04L 9/3239 (2013.01); H04L 2209/80 (2013.01); H04L 2209/84 (2013.01)

(58) Field of Classification Search
CPC . B60C 23/0416; B60C 23/044; H04L 9/0825; H04L 9/3239; H04L 2209/80; H04L 2209/84
USPC .......................................................... 340/442
See application file for complete search history.

(56) References Cited

U.S. PATENT DOCUMENTS 8,332,104 B2 * 12/2012 Greer ................. B60C 23/0462
                                                     701/72
10,075,819 B2    9/2018 Santavicca et al.
11,077,727 B2    8/2021 Schwegler et al.
2011/0313611 A1 * 12/2011 An ..................... B60C 23/0416
                                                     701/34.4
2012/0029767 A1 * 2/2012 Bailie ................. B60C 23/0416
                                                     701/36
(Continued)

OTHER PUBLICATIONS

Jiang Wan et al., Physical Layer Key Generation: Securing Wireless Communication in Automotive Cyber-Physical Systems, ACM Transactions on Cyber-Physical Systrems, vol. 3, No. 2, Article 13,Oct. 30, 2018, pp. 13:1-13:26.
(Continued)

*Primary Examiner* — Kerri L McNally
(74) *Attorney, Agent, or Firm* — Frank Lollo; Eversheds Sutherland (US) LLP

(57) ABSTRACT

A method to facilitate secure communication between a first tire pressure monitoring system (TPMS) and a vehicle is disclosed. The method may include obtaining a trigger signal to auto-locate the first TPMS from a plurality of TPMSs. The method may further include obtaining learning mode advertisements from each TPMS responsive to obtaining the trigger signal. The learning mode advertisements may include a random value and a test value associated with each TPMS. The test value may be an encrypted value generated using TPMS keys. The method may further include calculating a vehicle test value using the random value and a vehicle pre-shared key, and comparing the test value with the vehicle test value. The method may further include auto-locating the first TPMS based on the comparison. The method may include receiving vehicle tire condition data from the first TPMS responsive to auto-locating the first TPMS.

20 Claims, 6 Drawing Sheets

(56) References Cited

U.S. PATENT DOCUMENTS

| | | | |
|---|---|---|---|
| 2014/0002257 A1* | 1/2014 | Han | B60C 23/0477 |
| | | | 340/442 |
| 2014/0188348 A1 | 7/2014 | Gautama et al. | |
| 2014/0354420 A1* | 12/2014 | Terada | B60C 23/04 |
| | | | 340/442 |
| 2015/0057876 A1* | 2/2015 | Graham | B60C 23/0416 |
| | | | 701/33.4 |
| 2015/0057878 A1* | 2/2015 | Friel | B60C 23/0489 |
| | | | 701/33.7 |
| 2022/0256348 A1 | 8/2022 | McGrotty | |

OTHER PUBLICATIONS

Mahdi Dibaei et all, An Overview of Attacks and Defences on Intelligent Connected Vehicles, Jul. 17, 2019, pp. 1-36.

\* cited by examiner

TIRE PRESSURE MONITORING SYSTEM COMMUNICATION METHOD AND SYSTEM

FIELD

The present disclosure relates to a vehicle having a tire pressure monitoring system (TPMS), and more particularly, to a system and method to facilitate secure communication between the vehicle and the TPMS.

BACKGROUND

Conventional vehicles use pneumatic tires that support air pressure. Vehicle operators regularly monitor tire condition and re-fill the air in the tires to ensure efficient vehicle operation. Most modern vehicles have in-built tire-pressure monitoring systems (TPMSs) to assist the operators in monitoring the tire condition. Specifically, a TPMS uses tire/wheel sensors to measure air pressure in the tires. The TPMS outputs an alert to the vehicle operator when the air pressure may be low or there may be an air leakage in the tires.

Typically, the TPMS communicate with the vehicle using Ultra-high frequency (UHF) broadcasts that may include tire condition data and static sensor identity. There may be instances where more than one vehicle, which may be within the range of the TPMS, may receive such broadcasts. Typically, such broadcast messages are not secured, and hence the data included in the broadcast messages could potentially be spoofed by malicious users to create a fake flat tire alert or cause an adverse condition by hiding that a tire may be underinflated. In addition, the broadcast messages may contain static identifiers associated with the TMPS, which could potentially be used by malicious users to wirelessly track a vehicle throughout its drive as the broadcast messages are not secured.

Thus, there exists a need for a system and method to facilitate secure communication between the TPMS and the vehicle.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
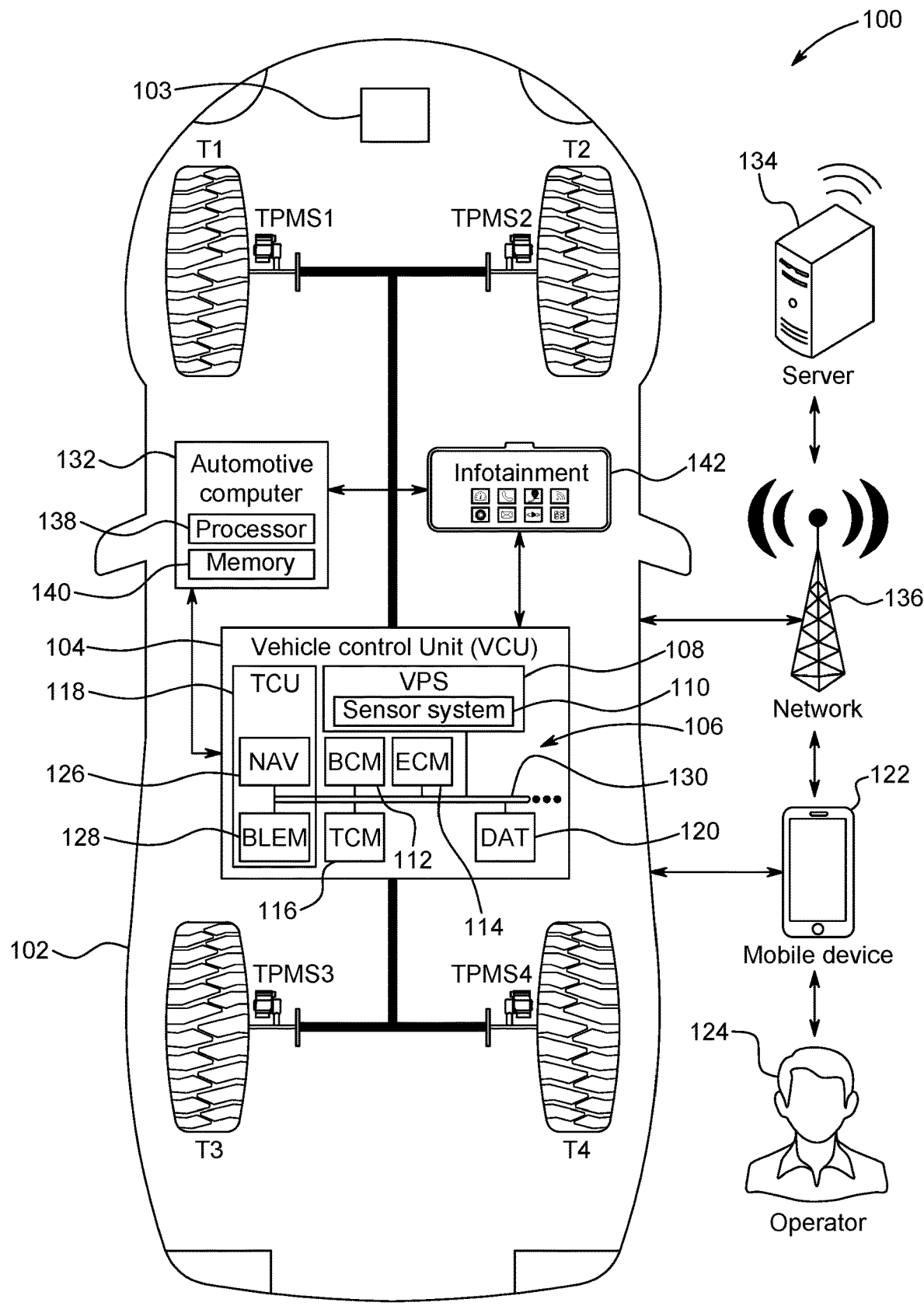
FIG. 1 depicts an example environment in which techniques and structures for providing the systems and methods disclosed herein may be implemented.

The present disclosure describes a system and method to facilitate secure communication between a vehicle and a tire pressure monitoring system (TPMS) associated with the vehicle. The TPMS may be a one-way TPMS that may be configured to broadcast tire information to the vehicle (and one or more nearby vehicles and may not receive signal/information from the vehicle). Stated another way, the one-way TPMS is capable to perform unidirectional broadcast communication. In an exemplary aspect, the TPMS may communicate with the vehicle by using Bluetooth Low Energy (BLE) protocol.

In some aspects, the TPMS may broadcast learning mode advertisements for a predetermined duration (e.g., in a TPMS learning mode/state), before transmitting tire information in a TPMS normal operating state. The learning mode advertisements may enable the vehicle to auto-locate the TPMS, so that the vehicle may obtain the tire information from the TPMS, and not from any other TPMS (that may not be associated with the vehicle).

In some aspects, the vehicle receives the broadcast learning mode advertisements from the TPMS and other TPMSs. Responsive to receiving the learning mode advertisements broadcast from the TPMSs, the vehicle may determine the TPMSs that may most likely be attached to the vehicle. For example, the vehicle may perform the determination of the TPMSs most likely to be attached to the vehicle by analyzing Received Signal Strength Indicator (RSSI) over time, tracking number of advertisements from each TPMS, correlating received wheel spin timestamps with data from vehicle's anti-lock braking systems (ABS) controllers, Angle of Arrival (AoA), Time of flight (ToF), TPMS status, rotation data, historical temperature and pressure values broadcast by the TPMS, and/or the like.

In some aspects, the vehicle may use content of the learning mode advertisements of the TPMSs determined as most likely to be attached to the vehicle and derive unique keys for each such TPMS to auto-locate the TMPS, as described below. The vehicle may discard content of the learning mode advertisements of non-attached TPMSs.

The learning mode advertisements may include a random value and a test value (along with other information). The test value may be an encrypted value that may be generated using a TPMS pre-shared key. The vehicle may auto-locate the TPMS by using the random value obtained from the TPMS and a vehicle pre-shared key. The vehicle pre-shared key may correspond to the TPMS pre-shared key to facilitate secure communication between the vehicle and the TPMS.

In some aspects, the vehicle may calculate a vehicle test value using the random value obtained from the TPMS and the vehicle pre-shared key. Responsive to calculating the vehicle test value, the vehicle may compare the vehicle test value with the test value obtained from the TPMS. The vehicle may auto-locate the TPMS when the vehicle test value matches with the test value. Responsive to the vehicle auto-locating the TPMS, the vehicle may store keys associated with the TPMS (derived using the vehicle test value) that may be used by the vehicle to receive tire information from the TPMS in a secure manner, and may discard content of other TPMSs.

The present disclosure provides system and method for securing communication between the TPMS and the vehicle such that the vehicle may learn the TPMS, and may receive tire information from the TPMS and not from any other TPMS that may not be associated with the vehicle. Since the vehicle learns the TPMS by matching test value obtained from the TPMS and the vehicle test value derived by the vehicle using the vehicle pre-shared key, the vehicle learns and attaches to reliable TPMSs, and may thus obtain accurate tire information. Further, since the vehicle learns and attaches with reliable TPMSs, communication between the TPMSs and the vehicle is secure and provides resistance against vehicle tracking.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 that may include a vehicle 102. The vehicle 102 may take the form of any passenger or commercial vehicle such as, for example, a car, a work vehicle, a crossover vehicle, a van, a minivan, a taxi, a bus, etc. Further, the vehicle 102 may be a manually driven vehicle, and/or be configured to operate in a fully autonomous (e.g., driverless) mode and/or partially autonomous mode, and may include any powertrain such as, for example, a gasoline engine, one or more electrically-actuated motor(s), a hybrid system, etc.

The vehicle 102 may include four tires T1, T2, T3, T4, where T1 may be the front left tire, T2 may be the front right tire, T3 may be the back left tire, and T4 may be the back right tire. In some aspects, the tires T1-T4 may be pneumatic tires.

In accordance with some aspects, the vehicle 102 may include one or more sensors mounted in or on, affixed to, embedded in, or otherwise coupled to the tires T1-T4. For instance, the tires T1-T4 may include tire pressure management systems 1-4 (TPMSs 1-4) that may include one or more wheel sensors (not shown). The wheel sensors may be configured to detect/monitor tire pressure and/or other characteristics of the tires T1-T4. In some aspects, in addition to having the wheel sensors, each TPMS 1-4 may include a communication module (for example, an antenna), and a control unit (not shown) that may enable the TPMS 1-4 to carry out various functions. The details of functions performed by the TPMSs 1-4 are described below in conjunction with FIGS. 2, 3A, 3B, and 4.

In some aspects, the TPMS 1-4 may be configured to receive inputs/data from the wheel sensors, and broadcast (via the communication module) the data to one or more communication devices that may be within the range of the TPMS 1-4. For example, the TPMS 1 may be configured to broadcast data from the wheel sensor included in the TPMS 1 to one or more electronic control units included in the vehicle 102 or other vehicles (not shown) that may in proximity to the vehicle 102. In some aspects, the TPMS 1 may be a one-way TPMS as the TPMS 1 may enable transmission/broadcast of the data to the communication devices (e.g., broadcast tire information, alert, and/or any other information associated with the tires T1-T4), but may not receive data from the communication devices. For example, the TPMS 1 may not receive feedback, pairing information, activation signal, etc. from the electronic control unit included in the vehicle 102.

The TPMS 1 may be further configured to transmit/broadcast learning advertisements for a predetermined duration and may activate normal operating state and transmit tire information to the electronic control units included in the vehicle 102 (or any other vehicle). The electronic control units included in the vehicle 102 may receive/obtain the learning advertisements from the TPMS 1 (along with learning advertisements received from other TPMSs included in the vehicle 102 and vehicles that may be in proximity to the vehicle 102), and may auto-locate the TPMS 1 using the learning advertisements. Auto-locating the TPMS 1 may facilitate the electronic control units included in the vehicle 102 to receive accurate and reliable tire information from the TPMS 1, as described in detail below.

The TPMS 1 may perform communication with the electronic control units included in the vehicle 102 via low-frequency signals, high-frequency signals, ultra-high frequency signals, Ultra-Wide Band (UWB) signals, Bluetooth® communication protocol, Bluetooth® Low Energy (BLE) protocol, Wi-Fi communication protocol, etc. In a preferred aspect, the TPMS 1 may perform communication with the electronic control units included in the vehicle 102 by using the BLE protocol.

In some aspects, the vehicle 102 may include a diagnostic tool 103, a Vehicle Control Unit (VCU) 104 that may include a plurality of electronic control units (ECUs) 106 (same as the electronic control units described above), and a Vehicle Perception System (VPS) 108 having connectivity with and/or control of one or more vehicle sensory system(s) 110.

The diagnostic tool 103 may communicatively couple with the TPMSs 1-4 via a wireless protocol (including low frequency (LF)). The diagnostic tool 103 may be configured to activate a manual learn mode on the TPMSs 1-4.

The ECUs 106 may communicatively couple with the TPMSs 1-4, as described above. In some aspects, the ECUs 106 may include one or more modules/units, such as, a Body Control Module (BCM) 112, an Engine Control Module (ECM) 114, a Transmission Control Module (TCM) 116, a Telematics Control Unit (TCU) 118, a Driver Assistances Technologies (DAT) controller 120, and the like. In some aspects, the ECUs 106 may control one or more vehicle operations using these units and by receiving inputs from human drivers, an autonomous vehicle controller, the TPMSs 1-4, and/or via wireless signal inputs received via wireless connection from other connected devices, such as a mobile device 122 (having a user interface) associated with a vehicle operator 124, among others.

In one or more aspects, the BCM 112 may include integration of one or more vehicle sensors, vehicle performance indicators, and variable reactors associated with vehicle systems. In addition, the BCM 112 may include processor-based power distribution circuitry that can control functions associated with the vehicle 102 body, such as the tires T1-T4, lights, windows, security, door locks, access control, and various comfort controls. The BCM 112 may also operate as a gateway for bus and network interfaces to interact with remote ECUs (not shown in FIG. 1).

In some aspects, the DAT controller 120 may provide Level-1 through Level-3 automated driving and driver assistance functionality that can include, for example, active parking assistance, trailer backup assistance, adaptive cruise control, lane keeping, and/or driver status monitoring, among other features. The DAT controller 120 can obtain input information via the one or more vehicle sensory system(s) 110, which may include sensors disposed on vehicle interior and/or exterior portions. In particular, the DAT controller 120 may receive information associated with tire conditions from the TPMSs 1-4, vehicle occupancy, driver functions, vehicle functions, environmental inputs, and other similar information, from the vehicle sensory system(s) 110.

In some aspects, the TCU 118 may be configured and/or programmed to provide vehicle connectivity to wireless computing systems onboard and off board the vehicle 102. The TCU 118 may include a Navigation (NAV) receiver 126 for receiving and processing a GPS signal from GPS (not shown in FIG. 1), a BLE® Module (BLEM) 128, a Wi-Fi transceiver, a UWB transceiver, and/or other wireless transceivers (not shown in FIG. 1) that may be configurable for wireless communication between the vehicle 102 and other systems, computers, and modules (including the TPMSs 1-4). The TCU 118 may be disposed in communication with the ECUs 106 by way of a bus 130.

In some aspects, the vehicle 102 may include an automotive computer 132 that may be installed in an engine compartment of the vehicle 102 (or elsewhere in the vehicle 102). The automotive computer 132 may be disposed in communication with the VCU 104, the mobile device 122, and one or more server(s) 134. In particular, the automotive computer 132 may share a wired or wireless communication bus with the VCU 104, and may be configured and/or programmed to exchange the vehicle data with the VCU 104.

In one or more aspects, the automotive computer 132 may communicate with the server(s) 134 that may be part of a cloud-based computing infrastructure. In particular, the servers(s) 134 may be associated with and/or include a Telematics Service Delivery Network (SDN) that provides digital data services to the vehicle 102 and other vehicles (not shown in FIG. 1) that may be part of a vehicle fleet.

In some aspects, the automotive computer 132 may use wired and/or wireless communication protocols and transceivers to connect with the mobile device 122 associated with the vehicle operator 124, and/or the TPMSs 1-4. Specifically, the mobile device 122 and/or the TPMSs 1-4 may communicatively couple with the automotive computer 132 via one or more network(s) 136. The network(s) 136 illustrate an example communication infrastructure in which the connected devices discussed in various embodiments of this disclosure may communicate.

The network(s) 136 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In some aspects, the automotive computer 132 may be or include an electronic vehicle controller, having one or more processors 138 and a memory 140. The one or more processors 138 may be disposed in communication with one or more memory devices disposed in communication with the respective computing systems (e.g., the memory 140 and/or one or more external databases not shown in FIG. 1). The one or more processors 138 may utilize the memory 140 to store programs in code and/or to store data for performing aspects in accordance with the disclosure.

The memory 140 may be a non-transitory computer-readable memory storing a code for monitoring vehicle tire condition. The memory 140 may include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the VCU 104 may control operational aspects of the vehicle 102 by using one or more instruction sets stored in the memory 140.

In some aspects, the automotive computer 132 may connect with a vehicle infotainment system 142 that may provide an interface for the navigation and GPS receiver. The vehicle infotainment system 142 may include a touchscreen interface portion (e.g., a user interface), and may include voice recognition features, biometric identification capabilities that can identify users based on facial recognition, voice recognition, fingerprint identification, or other biological identification means. In other aspects, the vehicle infotainment system 142 may provide user identification using mobile device pairing techniques (e.g., connecting with the mobile device 122, a Personal Identification Number (PIN)) code, a password, passphrase, or other identifying means. In additional aspects, the vehicle infotainment system 142 may display messages or notifications on the touchscreen interface, e.g., notifications associated with tire condition of the tires T1-T4.

In some aspects, the vehicle operator 124, the TPMSs 1-4, and/or the VCU 104/ECUs 106 implement and/or perform operations, as described here in the present disclosure, in accordance with the owner's manual, safety guidelines and applicable regulations and laws. Specifically, the ECUs 106 and the TPMSs 1-4 facilitate in providing secure communication between the TPMSs 1-4 and the vehicle 102 as described below, in accordance with the owner's manual, safety guidelines and applicable regulations and laws.

Figure 2:
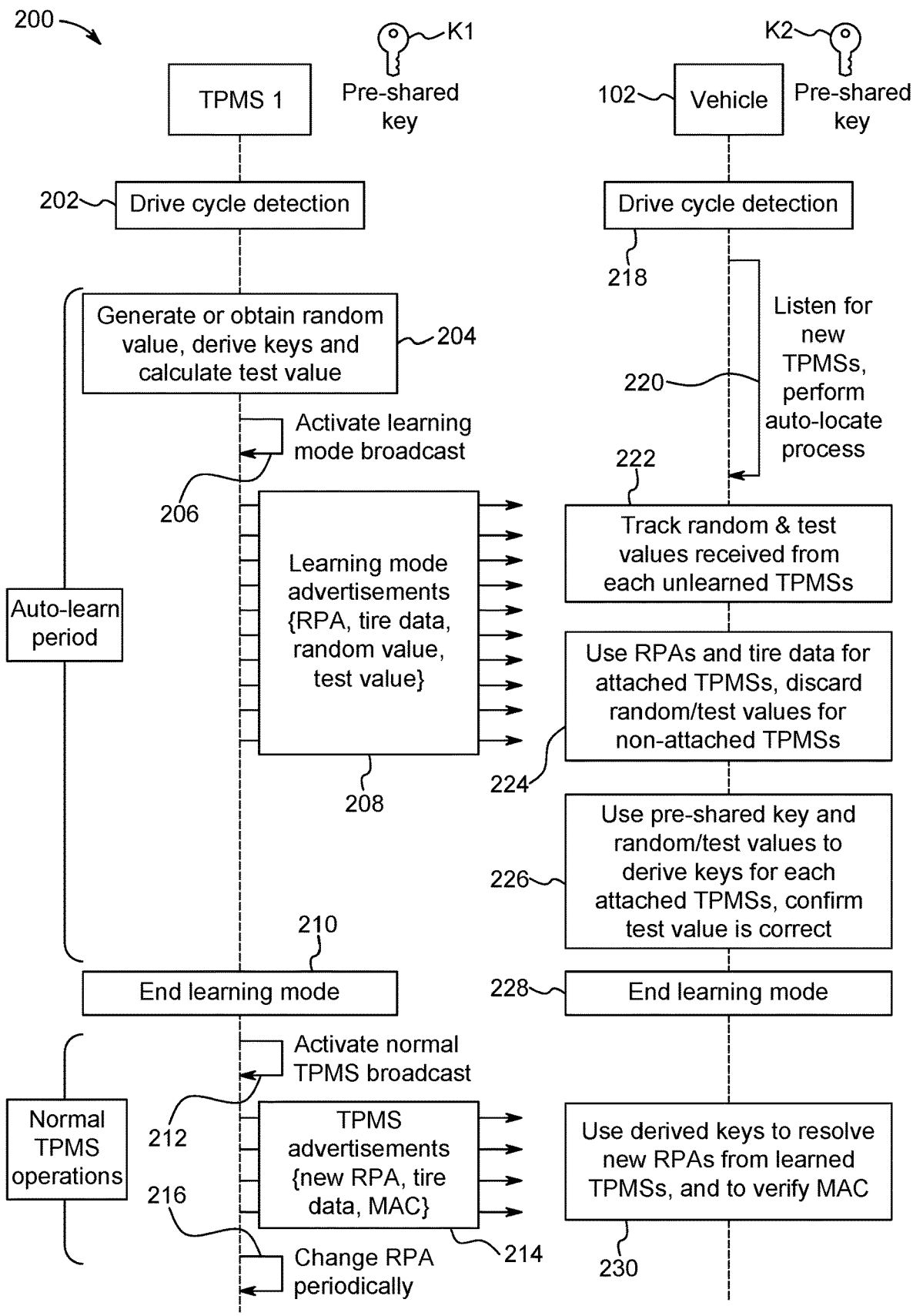
FIG. 2 depicts a flow diagram to facilitate secure communication between a tire-pressure monitoring system (TPMS) and a vehicle.
Figure 3A:
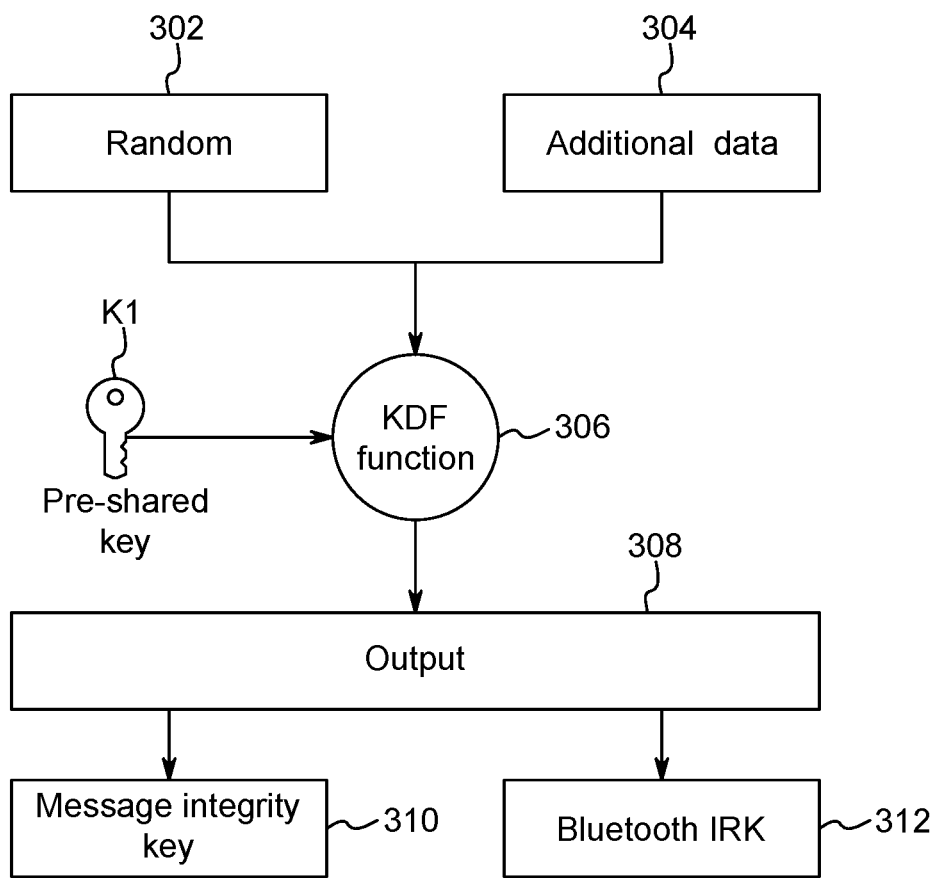
FIGS. 3A and 3B depict key generation mechanism to facilitate secure communication between a TPMS and a vehicle, in accordance with the present disclosure.
Figure 3B:
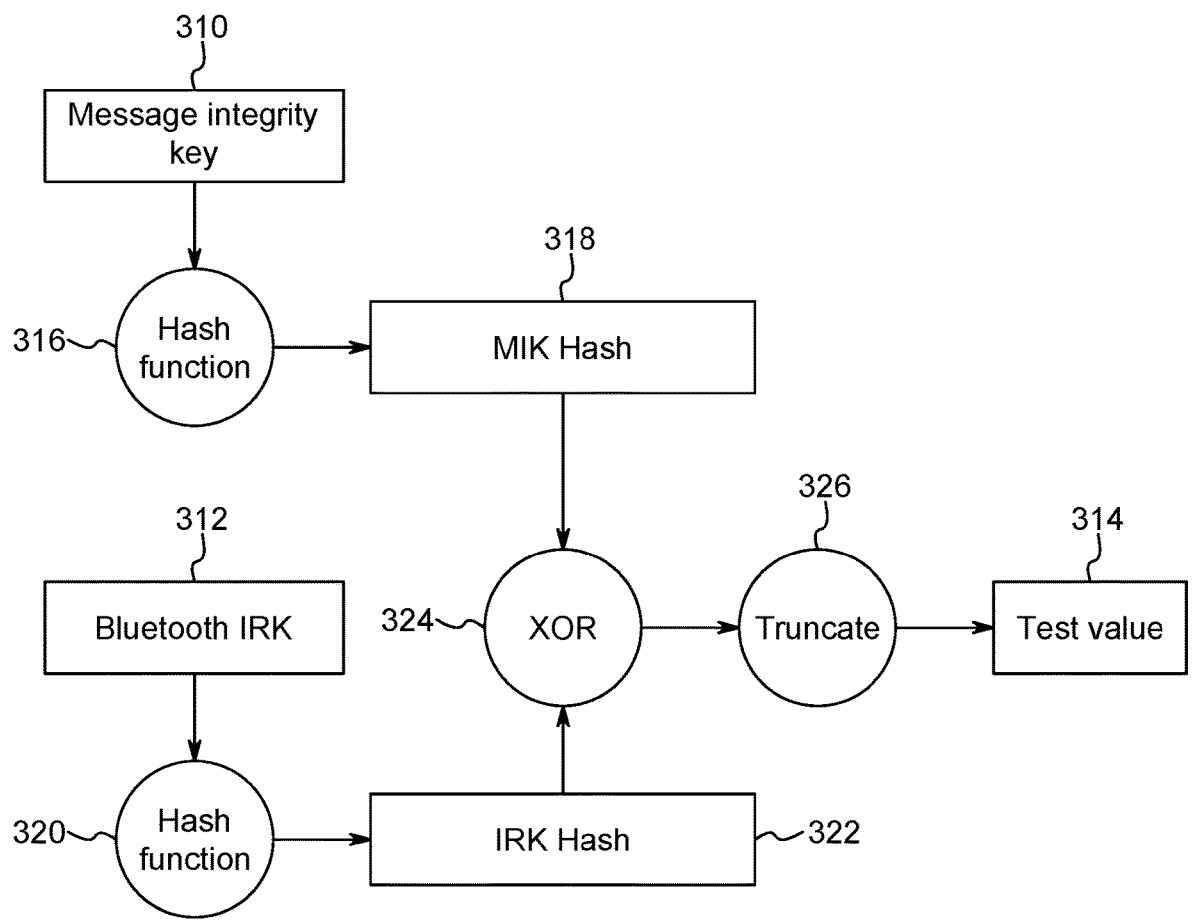

FIG. 2 depicts a flow diagram 200 to facilitate secure communication between a TPMS (e.g., the TPMS 1) and the vehicle 102. While describing FIG. 2, references may be taken from FIGS. 3A and 3B. FIGS. 3A and 3B depict key generation mechanism to facilitate secure communication between the TPMS 1 and the vehicle 102 (specifically, the ECUs 106), in accordance with the present disclosure.

In some aspects, the flow diagram 200 illustrates steps performed by each TPMS 1-4 and the vehicle 102 (or the ECU 106) to facilitate secure communication between the TPMSs 1-4 and the vehicle 102. As described above in conjunction with FIG. 1, the TPMS 1 may be a one-way TPMS that may be configured to broadcast data to the ECU 106, and may not be able to receive information from the vehicle 102/ECU 106 (e.g., feedback, pairing information, activation signal, etc.). Thus, the present disclosure provides mechanism to pair the ECU 106 and the one-way TPMS 1, so that the vehicle 102 may receive accurate and reliable tire information.

In some aspects, the vehicle 102 and the TPMS1 may have respective associated pre-shared keys. For example, the TPMS 1 may be associated with a pre-shared key K1, which may be provided/associated with the TPMS 1 during manufacturing. Similarly, the vehicle 102 may be associated with a pre-shared key K2, which may be provided/associated with the vehicle 102 during manufacturing or via over-the-air updates so that the vehicle 102 may be connected with the TPMS 1 (and the TPMSs 2-4). In some aspects, the pre-shared key K1 may correspond to the pre-shared key K2 so that the vehicle 102 may receive tire information from the TPMS 1 accurately (and not from any other TPMS that may not be part of the vehicle 102). The pre-shared keys K1 and K2 may be symmetric keys that may be identical for all TPMSs 1-4 and vehicle 102 components. Alternatively, the pre-shared keys K1 and K2 may be asymmetric key pairs that may be uniquely provisioned to the TPMSs 1-4 and the vehicle 102 components. For example, a private key may be provided to the TPMS 1, and a public key may be provided to the vehicle modules (e.g., the ECU 106) and may be distributed to the vehicle 102 through a Public Key Infrastructure (PKI) with signed certificates.

At a first step of the flow diagram 200, i.e., at step 202, the TPMS 1 may detect start of a new drive cycle or may obtain a learning mode trigger signal (e.g., a command signal to commence a learning mode sent by the vehicle operator 124 via the mobile device 122 or the vehicle infotainment system 142 or a technician to the TPMS 1 or via the diagnostic tool 103 as described in conjunction with FIG. 1). Responsive to detecting the drive cycle and/or obtaining the learning mode trigger signal, the TPMS 1 may start a sensor learning mode process or auto-learn period so that the vehicle 102 may learn the TPMS 1. The sensor learning mode process may be understood as follows.

At step 204, the TPMS 1 may generate or obtain random value, derive keys, and calculate test values. In some aspects, the TPMS 1 may obtain the keys and test values from any device internal or external to the TPMS 1. The step 204 may be understood in detail in conjunction with FIGS. 3A and 3B, which are described below.

Responsive to detecting the drive cycle and/or obtaining the learning mode trigger signal, the TPMS 1 may generate or obtain the random number 302 (or random value 302). In some aspects, the TPMS 1 may generate the random number 302 by using a Random number generator (RNG) that may be located in the TPMS 1 or may use static value set loaded to the TPMS 1 during manufacturing.

The TPMS 1 may then combine or concatenate the random number 302 with an additional data 304. In some aspects, the additional data 304 may be associated with tire information (e.g., the tire T1). The TPMS 1 may further transmit the combined random number 302 and additional data 304 to a Key Derivation Function (KDF) 306 that may be located in the TPMS 1. In some aspects, the KDF 306 may be a Hashed message authentication code (HMAC)-based KDF. The KDF 306 may receive the combined random number 302 and the additional data 304, and may generate an arbitrary count/number of output bytes (shown as output 308 in FIG. 3A), using the pre-shared key K1 associated with the TPMS 1. Stated another way, the KDF 306 may be configured to output the arbitrary number of output bytes based on the random number 302, the additional data 304, and the pre-shared key K1.

In some aspects, one portion of the output bytes (or the output 308) may be used as a message integrity key 310 to protect TPMS 1 data (e.g., tire pressure/condition data), and another portion may be used as a Bluetooth Identity Resolution Key (IRK) 312 to generate and resolve Resolvable Private Address (RPA) associated with the TPMS 1 (e.g., the RPA that the TPMS 1 may transmit to the ECU 106, as described later in the description below). In some aspects, the TPMS 1 may generate the RPA periodically, e.g., when a new drive cycle starts. A person ordinarily skilled in the art may appreciate that the RPA is a resolvable address that may be resolved by using a key shared with a trusted device. Specifically, the TPMS 1 may transmit the RPA along with the tire data, which may be resolved by the vehicle 102 (e.g., the ECU 106) by using the pre-shared key K2, thereby maintaining secure communication and mitigating vehicle tracking concerns between the TPMS 1 and the vehicle 102, to protect privacy.

In further aspects, the TPMS 1 may use the message integrity key 310 and the Bluetooth IRK 312 to generate the test value 314, as shown in FIG. 3B. The test value 314 may be an encrypted value that may be generated using TPMSs keys (e.g., the message integrity key 310 and the Bluetooth IRK 312). The test value 314 may enable the vehicle 102 to confirm if the TPMS 1 is an authentic TPMS to receive accurate information associated with vehicle tires (e.g., the tire T1).

Specifically, the TPMS 1 may calculate the test value 314 by hashing both the message integrity key 310 and the Bluetooth IRK 312. For example, the TPMS 1 may input the message integrity key 310 to a first hash function 316 that may generate a hashed message integrity key 318 (or an MIK hash 318). Similarly, the TPMS 1 may input the Bluetooth IRK 312 in a second hash function 320 that may generate a hashed Bluetooth IRK 322 (or an IRK hash). The first hash function 316 may be same as the second hash function 320. In some aspects, the first hash function 316 and the second hash function 320 may include a Secure Hash Algorithm 256-bit (SHA-256), Miyaguchi-Preneel, and/or the like.

The TPMS 1 may then combine the hashed message integrity key 318 and hashed Bluetooth IRK 322. For example, the TPMS 1 may combine the hashed message integrity key 318 and hashed Bluetooth IRK 322 by XORing the hashed message integrity key 318 and the hashed Bluetooth IRK 322. Specifically, the TPMS 1 may input the hashed message integrity key 318 and hashed Bluetooth IRK 322 in a XOR logic 324, and then truncate output (e.g., reduce output size) of the XOR logic 324 by using a truncation function 326 to generate the test value 314. In some aspects, the test value 314 may be a truncated value that may fit within predetermined bytes of payload space available within advertisements (e.g., 31 bytes of payload space within BLE advertisements) that the TPMS 1 may broadcast to the ECU 106, as described below.

Responsive to generating the test value 314 and the keys (e.g., the message integrity key 310 and the Bluetooth IRK 312), the TPMS 1 may activate learning mode broadcast at step 206, as shown in FIG. 2. Responsive to activating the learning mode broadcast, the TPMS 1 may broadcast learning mode advertisements, as shown in step 208. In an exemplary aspect, in the learning mode advertisements, the TPMS 1 may broadcast the test value 314, the random number 302, along with tire information/data (e.g., timestamps for wheel spin data) and the RPA, which may be received by the vehicle 102 (specifically, the ECU 106) to auto-locate the TPMS 1. A person ordinarily skilled in the art may appreciate from the description above that the TPMS 1 broadcasts the test value 314 that may be derived from the message integrity key 310 and the Bluetooth IRK 312 (e.g., by hashing the message integrity key 310 and the Bluetooth IRK 312), and does not broadcast the message integrity key 310 and the Bluetooth IRK 312 directly, to maintain secure communication between the TPMS 1 and the vehicle 102 (e.g., to protect privacy).

The TPMS 1 may continue to broadcast the learning mode advertisements for a predetermined time duration. For example, the TPMS 1 may broadcast the learning mode advertisements from a few seconds (e.g., 10-15 seconds) to a few minutes (e.g., 2-4 minutes). The TPMS 1 may end sensor learning mode process and may stop broadcasting the learning mode advertisements (as shown in step 210) when the predetermined time duration lapses. Responsive to stopping the broadcast of the learning mode advertisements, the TPMS 1 may activate TPMS normal operating state at step 212. Responsive to activating the TPMS normal operating state, the TPMS 1 may transmit TPMS advertisements at step 214. Specifically, in the TPMS normal operating state, the TPMS 1 may transmit new RPA, tire or TPMS data (e.g., tire pressure data) that may be protected with Message Authentication Codes (MACs) generated by using the message integrity key 310. The new RPA may be resolved using the Bluetooth IRK 312, as described above. The TPMS 1 may then change the RPA (for example, when a new drive cycle starts), as shown in step 216.

Similar to the TPMS 1, the vehicle 102 (e.g., the ECU 106) may also detect start of a new drive cycle or obtain a learning mode trigger (e.g., vehicle operator 124 initiated manual sensor scan from the vehicle infotainment system 142) to learn/auto-locate the TPMS 1, at step 218. Hereinafter, the steps performed by the ECU 106 are referred to as steps performed by the vehicle 102.

In some aspects, the step 218 may be performed in parallel with the step 202, as shown in FIG. 2. When the vehicle 102 detects the new drive cycle or obtains the learning mode trigger signal, the vehicle 102 may enter a learning mode (e.g., TPMS learning mode). In the learning mode, the vehicle 102 may "listen" for new TPMS sensors or TPMSs (including the TPMS 1) that may in proximity to the vehicle 102 for a predetermined time duration, and may initiate auto-locate process of the TPMS 1, as shown in step 220. Specifically, the vehicle 102 may receive the learning mode advertisements broadcast from the new TPMSs for the predetermined time duration (e.g., from a few seconds to a few minutes, as described above). The learning mode advertisements may include RPA, tire data, random value, and test value broadcast from the new TPMSs (e.g., "unlearned" sensors/TPMSs for the vehicle 102). For example, the vehicle 102 may receive the test value 314, the random number 302, along with tire information (e.g., timestamps for wheel spin data) and RPA from the TPMS 1 in the learning mode advertisements.

Responsive to receiving the learning mode advertisements broadcast from the new TPMSs, the vehicle 102 may track random number and test value associated with each unlearned TPMS, as shown in step 222. For example, when the vehicle 102 receives learning mode advertisements from four TPMSs, the vehicle 102 may obtain four sets of random numbers and test values in the broadcasted learning mode advertisements. In some aspects, the vehicle 102 may store the learning mode advertisements (e.g., the tracked random numbers/test values) in the memory 140.

In further aspects, responsive to receiving the learning mode advertisements broadcast from the new TPMSs, the vehicle 102 may determine the TPMSs that may most likely be attached to the vehicle 102, based on the received learning mode advertisements. For example, the vehicle 102 may perform the determination of the TPMSs most likely to be attached to the vehicle 102 by analyzing Received Signal Strength Indicator (RSSI) over time, tracking number of advertisements from each TPMS, correlating received wheel spin timestamps with data from vehicle's anti-lock braking systems (ABS) controllers, Angle of Arrival (AoA), Time of flight (ToF), TPMS status, rotation data, historical temperature and pressure values broadcast by the TPMS, and/or the like.

When the predetermined time duration lapses, the vehicle 102 may use content of the learning mode advertisements of the TPMSs determined as most likely to be attached to the vehicle 102 and derive unique keys for each such TPMS (hereinafter referred to as "attached TPMSs"). Specifically, the vehicle 102 may use RPAs and tire data of the attached TPMSs, and discard random values and test values of non-attached TPMSs, as shown in step 224.

At step 226, the vehicle 102 may derive keys for each attached TPMS and locate the TPMS 1 (i.e., authenticate the TPMS 1). In the present disclosure "auto-locate a TPMS" and "authenticate a TPMS" have same meaning, and these terms are interchangeably used. Specifically, the vehicle 102 may use the pre-shared key K2, the random numbers and the test values shared by the attached TPMSs, and the KDF (similar to the KDF 306) to derive unique vehicle message integrity key, vehicle Bluetooth IRK, and vehicle test value for each attached TPMS. The vehicle 102 may derive the vehicle message integrity key, the vehicle Bluetooth IRK, and vehicle test value in the same manner as described above for the TPMS 1. For example, the vehicle 102 may derive the vehicle message integrity key and the vehicle Bluetooth IRK by using the pre-shared key K2, the random number, and the KDF. Further, the vehicle 102 may derive the vehicle test value using the vehicle message integrity key and the vehicle Bluetooth IRK.

Responsive to deriving the vehicle test value, the vehicle 102 may compare the vehicle test value with the test value associated with each attached TPMS. Based on the comparison, the vehicle 102 may identify/auto-locate the TPMS 1 (i.e., authenticate and validate the TPMS 1). For example, the vehicle 102 may locate the TPMS 1 when the vehicle test value matches with the test value 314.

When the vehicle 102 identifies the TPMS 1, the vehicle 102 may end learning mode as shown in step 228. At this step, the vehicle 102 may "learn" the TPMS 1 and may store the derived keys associated with the TPMS 1 in the memory 140. Specifically, the vehicle 102 may store the vehicle message integrity key and the vehicle Bluetooth IRK, which corresponds to the test value 314, in the memory 140. In some aspects, the vehicle 102 may "unlearn" other attached TPMSs and may discard derived keys (and other information) associated with the attached and unlearned TPMSs (e.g., due to derivation errors or sensor being spoofed by some other Bluetooth device that does not have the pre-shared key K1), when the derived vehicle test value may not match with test values obtained from such attached and unlearned TPMSs.

At step 230, the vehicle 102 may listen for TPMS advertisements that may be transmitted by the TPMS 1 (i.e., attached and learned TPMS), e.g., after exiting learning mode. As discussed above, the TPMS 1 may transmit the TPMS advertisements (containing the tire data, new RPA, and MAC) in normal TPMS operation. The vehicle 102 may use the derived keys (such as the vehicle message integrity key and the vehicle Bluetooth IRK associated with the TPMS 1) to resolve the new RPA (or changing RPAs) and verify the integrity of any received data from the TPMS 1. For example, the vehicle 102 may use the vehicle integrity key (associated with the TPMS 1) to verify the MAC in the TPMS advertisements. Since the vehicle 102 may only attempt to perform these learning actions with TPMSs found most likely to be attached to the vehicle 102, and the pre-shared secret keys may be required to derive the correct values, the vehicle 102 may have assurance that the vehicle 102 may be receiving data from authentic TPMSs.

The TPMS 1 and vehicle 102 may store and use the learned keys indefinitely, or the learned keys may be replaced with new keys at the start of each drive cycle or manual learn event to increase vehicle and TPMS communication security.

Figure 4:
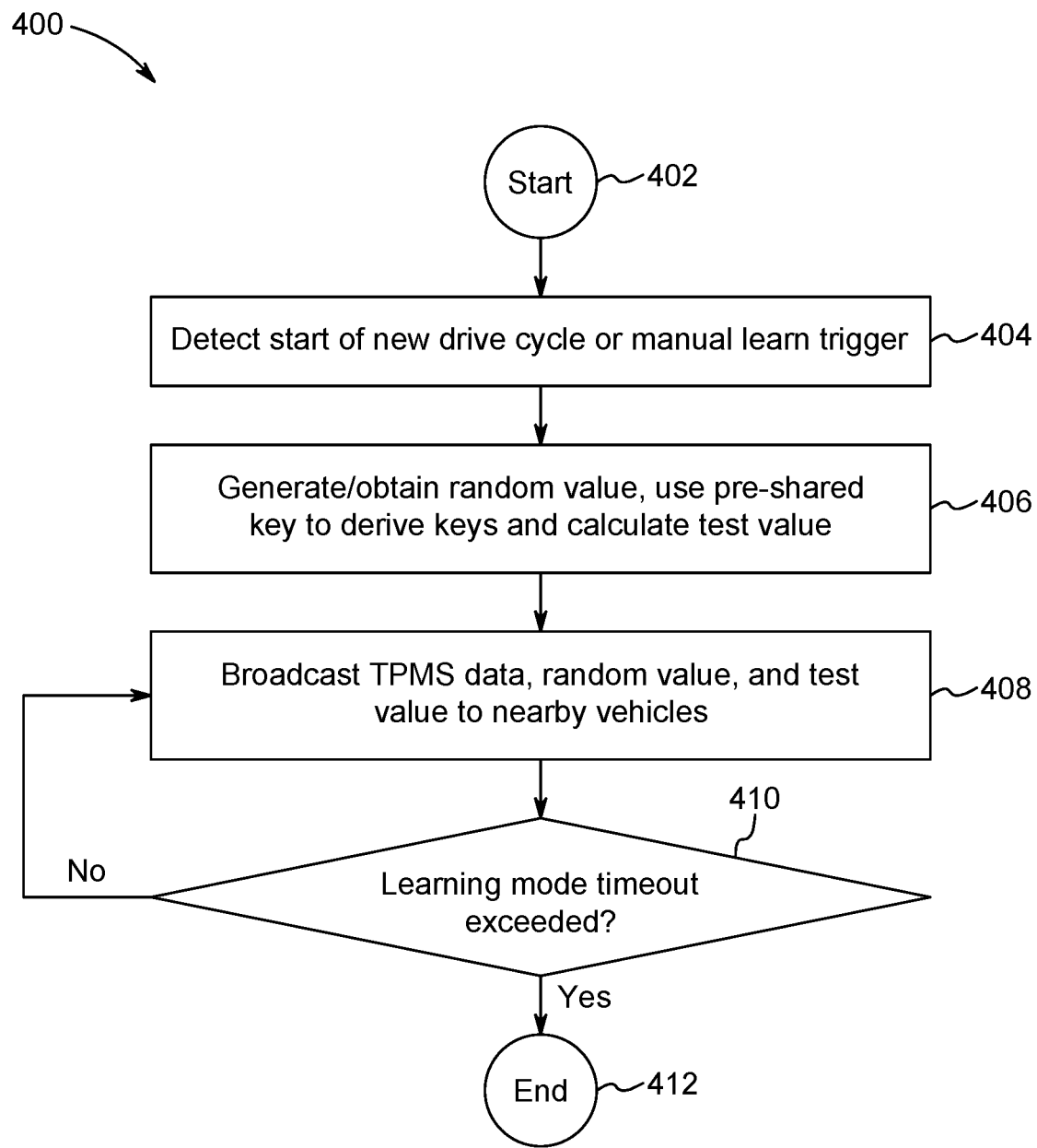
FIG. 4 depicts a flow diagram of an example method for one-way TPMS learning by a TPMS, in accordance with the present disclosure.

FIG. 4 depicts a flow diagram of an example method 400 for one-way TPMS learning by a TPMS (e.g., the TPMS 1), in accordance with the present disclosure. FIG. 4 may be described with continued reference to prior figures. The following process is exemplary and not confined to the steps described hereafter. Moreover, alternative embodiments may include more or less steps that are shown or described herein and may include these steps in a different order than the order described in the following example embodiments.

Referring to FIG. 4, at step 402, the method 400 may commence. At step 404, the method 400 may include detecting, by the TPMS 1, start of new drive cycle or obtaining manual learn trigger (or learning trigger signal) to enable the vehicle 102 to auto-locate the TPMS 1. At step 406, the method 400 may include generating/obtaining the random number 302, deriving keys (e.g., the message integrity key 310 and the Bluetooth IRK 312) using the pre-shared key K1, and calculating the test value 314, responsive to starting the new drive cycle or obtaining learning trigger signal. As discussed above in conjunction with FIGS. 2, 3A and 3B, the TPMS 1 may derive the message integrity key 310 and the Bluetooth IRK 312 by using the random number and the pre-shared key K1 associated with the TPMS 1. Further, the TPMS 1 may derive or generate the test value 314 by using the message integrity key 310 and the Bluetooth IRK 312. For example, the TPMS 1 may derive the test value 314 by hashing the message integrity key 310 and the Bluetooth IRK 312, and concatenating hashed keys (hashed message integrity key and hashed Bluetooth IRK).

At step 408, the method 400 may include broadcasting, by the TPMS 1, the learning mode advertisements to vehicles (including the vehicle 102) in proximity to the TPMS 1. The learning mode advertisements may include the random number 302 and the test value 314. In some aspects, the learning mode advertisements may include tire data (or TPMS data) and RPA, as described above. The TPMS 1 may broadcast the learning mode advertisements for a predetermined time duration.

At step 410, the method 400 may include determining, by the TPMS 1, whether learning mode timeout has exceeded or whether the predetermined duration is over. Responsive to a determination that the learning mode timeout may not have exceeded (i.e., the predetermined duration may not be over), the method 400 may move back to step 408, and the TPMS 1 may continue to broadcast the learning mode advertisements. On the other hand, responsive to a determination that the learning mode timeout may have exceeded, the method 400 may move to step 412, at which the method 400 ends, and the TPMS 1 may stop broadcasting the learning mode advertisements.

Figure 5:
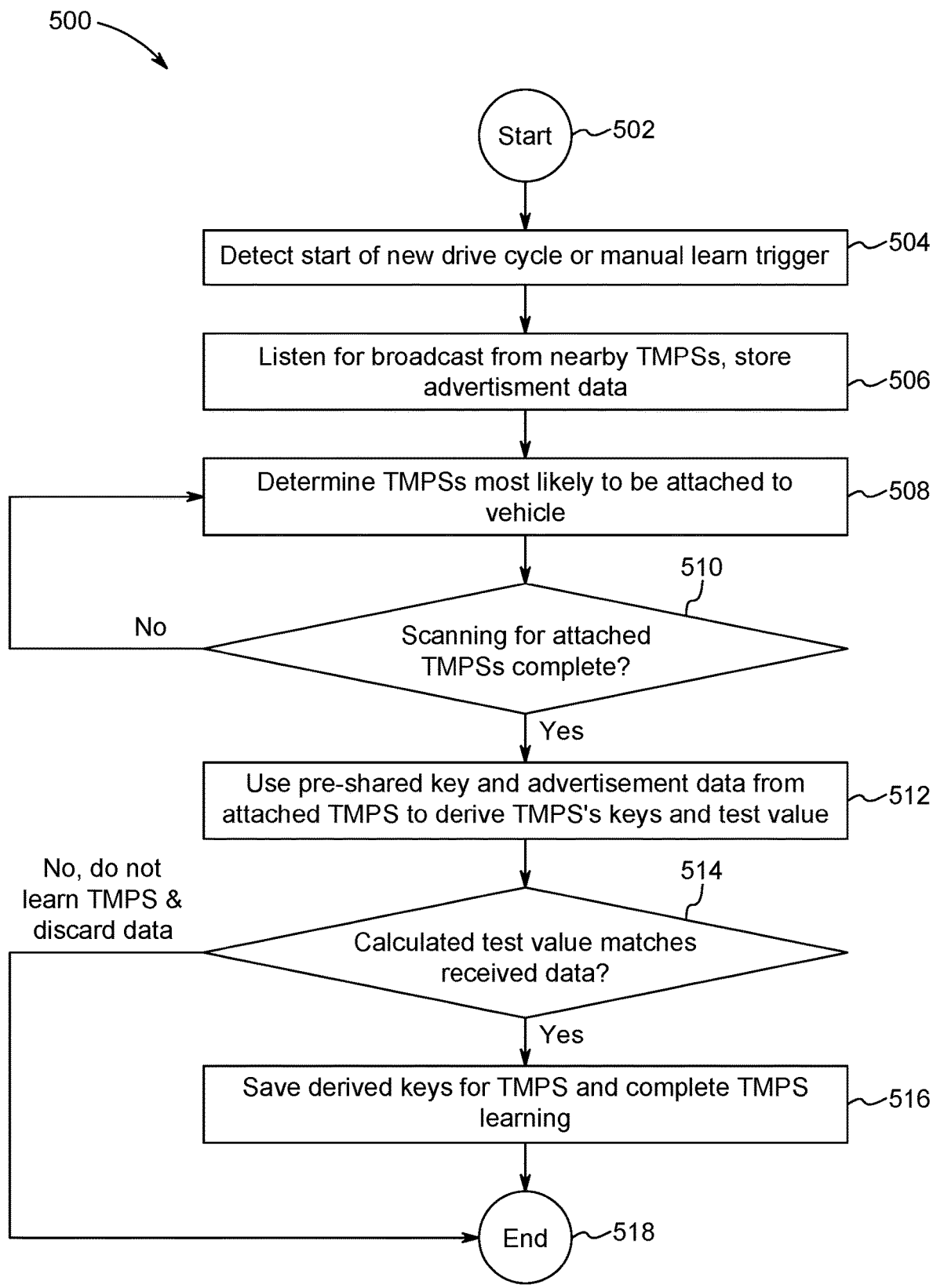
FIG. 5 depicts a flow diagram of an example method for one-way TPMS learning by a vehicle, in accordance with the present disclosure.

FIG. 5 depicts a flow diagram of an example method 500 for one-way TPMS learning by a vehicle (e.g., by the vehicle 102 or the ECU 106), in accordance with the present disclosure. FIG. 5 may be described with continued reference to prior figures. The following process is exemplary and not confined to the steps described hereafter. Moreover, alternative embodiments may include more or less steps that are shown or described herein and may include these steps in a different order than the order described in the following example embodiments.

Referring to FIG. 5, at step 502, the method 500 may commence. At step 504, the method 500 may include detecting, by the vehicle 102, start of a new drive cycle or obtaining a manual learn trigger (or learning mode trigger).

At step 506, the method 500 may include listening, by the vehicle 102, broadcast from nearby TPMS sensors or TPMSs (including the TPMS 1). For example, when the vehicle 102 detects the new drive cycle or obtains the learning mode trigger signal, the vehicle 102 may listen for new TPMSs (e.g., unlearned TPMSs, including the TPMS 1) for a predetermined time duration, and may initiate auto-locate process of the TPMS 1. Specifically, the vehicle 102 may receive the learning mode advertisements (including test values, random numbers, along with tire information and RPAs) from the new TPMSs. The vehicle 102 (e.g., the ECU 106) may store and track the random number and the test value associated with each unlearned TPMS.

At step 508, the method 500 may include determining, by the vehicle 102, TPMSs that may most likely be attached to the vehicle 102. The details of such determination are already described above in conjunction with FIG. 2. At step 510, the method 500 may include determining, by the vehicle 102, whether the predetermined time duration is over or whether scanning for attached TPMSs is complete. Responsive to a determination that the predetermined time duration may not be over or scanning for attached TPMS may not yet be completed, the method 500 may move back to the step 506, and the vehicle 102 may continue listening broadcast from nearby TPMSs. On the other hand, responsive to a determination that the predetermined time duration may be over or scanning for attached TPMSs may be complete, the method 500 may move to step 512.

At step 512, the method 500 may include using, by the vehicle 102, the pre-shared key K2 associated with the vehicle 102 and the learning mode advertisements received from all attached TPMSs to derive TPMS keys and test values. Specifically, the vehicle 102 may use the pre-shared key K2, the random numbers, and the test values (shared by the attached TPMSs), and the KDF to derive/calculate unique vehicle message integrity key, vehicle Bluetooth IRK, and vehicle test value for each attached TPMS, as described above in conjunction with FIG. 2.

At step 514, the method 500 may include determining, by the vehicle 102, whether the calculated vehicle test value matches with received data (i.e., the test value associated with an attached TPMS). Responsive to a determination that the calculated vehicle test value does not match with the test value, the method 500 may not learn the TPMS, discard the advertisements received from the attached TPMS, and move to step 518 at which the method 500 ends. On the other hand, responsive to a determination that the calculated vehicle test value matches with the test value (for example test value 314), the method 500 may move to step 516. At step 516, the method 500 may include saving, by the vehicle 102, derived keys for the TPMS 1 and complete learning of the TPMS 1, as described above. The method 500 ends at step 518.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a first tire pressure monitoring system (TPMS) configured to monitor a vehicle tire condition; and
an electronic control unit (ECU) coupled to the TPMS, wherein the ECU is configured to:
obtain a trigger signal to auto-locate the first TPMS from a plurality of TPMSs;
obtain learning mode advertisements from each TPMS of the plurality of TPMSs responsive to obtaining the trigger signal, wherein the learning mode advertisements comprises a random value and a test value associated with each TPMS, and wherein the test value is an encrypted value generated using TPMS keys;
calculate a vehicle test value using the random value and a vehicle pre-shared key;
compare the obtained test value with the calculated vehicle test value;
auto-locate the first TPMS when the obtained test value associated with the first TPMS matches with the calculated vehicle test value; and
receive vehicle tire condition data from the first TPMS responsive to auto-locating the first TPMS.

2. The vehicle of claim 1, wherein the first TPMS is further configured to broadcast the vehicle tire condition to the ECU, and wherein the first TPMS is a one-way TPMS configured to perform unidirectional broadcast communication.

3. The vehicle of claim 2, wherein the first TPMS enables communication with the ECU using Bluetooth Low Energy (BLE) protocol.

4. The vehicle of claim 1, wherein the first TPMS is associated with a TPMS pre-shared key, and wherein the test value is generated using the TPMS pre-shared key.

5. The vehicle of claim 4, wherein the TPMS pre-shared key corresponds to the vehicle pre-shared key.

6. The vehicle of claim 4, wherein the first TPMS is further configured to generate a message integrity key configured to protect vehicle tire condition information, and a Bluetooth Identity Resolution Key (IRK) configured to resolve Resolvable Private Address (RPA) transmitted by the first TPMS.

7. The vehicle of claim 6, wherein the first TPMS is configured to generate the message integrity key and the Bluetooth IRK using the TPMS pre-shared key and the random value.

8. The vehicle of claim 6, wherein the first TPMS is configured to generate the test value using the Bluetooth IRK and the message integrity key.

9. The vehicle of claim 8, wherein the first TPMS is configured to generate the test value by hashing the message integrity key and the Bluetooth IRK, and concatenating hashed message integrity key and hashed Bluetooth IRK.

10. The vehicle of claim 6, wherein the first TPMS is configured to transmit the learning mode advertisements associated with the first TPMS for a predetermined time duration.

11. The vehicle of claim 10, wherein the first TPMS is further configured to:
- activate a normal operating state of the TPMS after the predetermined time duration; and
- transmit vehicle tire condition data responsive to activating the normal operating state, wherein the vehicle tire condition data comprises tire pressure data, changeable RPA and Message Authentication Codes (MACs).

12. The vehicle of claim 11, wherein the ECU is further configured to:
- derive the Bluetooth IRK using the vehicle pre-shared key and the random value obtained from the first TPMS;
- receive the vehicle tire condition data from the TPMS; and
- obtain the tire pressure data from the vehicle tire condition data based on the Bluetooth IRK, wherein the Bluetooth IRK is configured to resolve the changeable RPA.

13. The vehicle of claim 11, wherein the first TPMS is configured to generate a new random value in response to obtaining next trigger signal, and wherein the first TPMS is configured to generate a new message integrity key and a new Bluetooth IRK using the TPMS pre-shared key and the new random value.

14. The vehicle of claim 1, wherein the ECU is further configured to:
- determine one or more TPMSs from the plurality of TPMSs which are likely to be attached to the vehicle, wherein the one or more TPMSs comprises the first TPMS;
- calculate the vehicle test value for the determined one or more TPMSs; and
- auto-locate the first TMPS based on the calculated vehicle test value.

15. A method to facilitate secure communication between a first tire pressure monitoring system (TPMS) and a vehicle, wherein the method comprising:
- obtaining, by an electronic control unit (ECU) of the vehicle, a trigger signal to auto-locate the first TPMS from a plurality of TPMSs, wherein the first TPMS is configured to monitor a vehicle tire condition;
- obtaining, by the ECU, learning mode advertisements from each TPMS of the plurality of TPMSs responsive to obtaining the trigger signal, wherein the learning mode advertisements comprises a random value and a test value associated with each TPMS, and wherein the test value is an encrypted value generated using TPMS keys;
- calculating, by the ECU, a vehicle test value using the random value and a vehicle pre-shared key;
- comparing, by the ECU, the obtained test value with the calculated vehicle test value;
- auto-locating, by the ECU, the first TPMS when the obtained test value associated with the first TPMS matches with the calculated vehicle test value; and
- receiving, by the ECU, vehicle tire condition data from the first TPMS responsive to auto-locating the first TPMS.

16. The method of claim 15, wherein the first TPMS is configured to broadcast the vehicle tire condition to the ECU, and wherein the first TPMS is a one-way TPMS configured to perform unidirectional broadcast communication.

17. The method of claim 15, wherein the first TPMS enables communication with the ECU using Bluetooth Low Energy (BLE) protocol.

18. The method of claim 15, wherein the first TPMS is associated with a TPMS pre-shared key, and wherein the test value is generated using the TPMS pre-shared key.

19. The method of claim 18, wherein the TPMS pre-shared key corresponds to the vehicle pre-shared key.

20. A non-transitory computer-readable storage medium in a distributed computing system, the non-transitory computer-readable storage medium having instructions stored thereupon which, when executed by a processor, cause the processor to:
- obtain a trigger signal to auto-locate a first tire pressure monitoring system (TPMS), from a plurality of TPMSs, wherein the first TPMS is configured to monitor a vehicle tire condition of a vehicle;
- obtain learning mode advertisements from each TPMS of the plurality of TPMSs responsive to obtaining the trigger signal, wherein the learning mode advertisements comprises a random value and a test value associated with each TPMS, and wherein the test value is an encrypted value generated using TPMS keys;
- calculate a vehicle test value using the random value and a vehicle pre-shared key;
- compare the obtained test value with the calculated vehicle test value;
- auto-locate the first TPMS when the test value associated with the first TPMS matches with the vehicle test value; and
- receive vehicle tire condition data from the first TPMS responsive to auto-locating the first TPMS.

* * * * *